3,751,509
PROCESS FOR ISOLATING ISOBUTYLENE FROM BUTANE-BUTYLENE FRACTION
Alexandr Grigorievich Liakumovich, prospekt Lenina 23, kv. 4; Jury Ivanovich Michurov, prospekt Lenina 13, kv. 4; and Nonna Fedorovna Kian, ulitsa Voxalnaya 2v, kv. 55, all of Sterlitamak, U.S.S.R.; Valerian Mikhailovich Sobolev, Naberezhnaya imeni Gorkogo 46–50, kv. 185, Moscow, U.S.S.R.; and Vladimir Ivanovich Ponomarenko, ulitsa Yakutova 22, Sterlitamak, U.S.S.R.
No Drawing. Filed July 17, 1972, Ser. No. 272,663
Int. Cl. C07c 11/12
U.S. Cl. 260—677 A                      6 Claims

ABSTRACT OF THE DISCLOSURE

A process for isolating isobutylene from butane-butylene fraction which comprises treating butane-butylene fraction with phenol or alkylphenol in the presence of a catalyst such as aluminium, alkylaluminium or aluminium phenoxide, in an amount of at least 0.5% by weight as calculated for the starting phenol or alkylphenol at a temperature within a range of from 100 to 160° C. and under a pressure of from 2 to 30 atm. The resulting product of interaction of phenol or alkylphenol and isobutylene is subjected to decomposition in the presence of the above-mentioned catalyst at a temperature of from 180 to 240° C. until isobutylene is formed, as well as the starting phenol or a mixture of the starting phenol with mono- or di-tert.butylphenols, or the starting alkylphenol of a mixture of the starting alkylphenol with its mono- and di-tert.butyl derivatives. Isobutylene is isolated, whereas the phenols resulting from the decomposition are recycled to the stage of treating butane-butylene fraction.

The process of the present invention enables the elimination of isobutylene losses due to its polymerization and copolymerization with butenes, as well as avoidance of equipment corrosion and catalyst losses.

---

The present invention relates to process for isolating isobutylene from butane-butylene fraction. Isobutylene is extensively used for the production of butyl rubber, isoprene, resins, and lubricating oils.

Known in the art is a process for isolating isobutylene from butane-butylene fraction by treating said fraction with phenol or alkylphenol in the presence of a catalyst such as sulphuric acid at a temperature of 30 to 80° C. under a pressure of 2 to 30 atm. The resulting product of interaction of alkylphenol or phenol with isobutylene is subjected to decomposition in the presence of the same catalyst at a temperature of from 80 to 110° C. The decomposition of said product is conducted until isobutylene is formed which is withdrawn in a gaseous state, as well as the starting phenol or a mixture of the starting phenol with mono- and di-tert.butylphenols, or the starting alkylphenol, or a mixture of the starting alkylphenol with its mono- and di-tert.butyl derivatives. The phenols resulting from said decomposition are recycled to the stage of butane-butylene fraction treatment.

Said prior-art process has a disadvantage residing in that isobutylene polymerization and copolymerization with butenes is observed in the presence of sulphuric acid which results in the formation of polymeric products in an amount of 5 to 10% as calculated for the weight of the isobutylene being isolated.

In addition, for practical implementation of said prior-art process it is necessary to employ special acid-resistant equipment, since sulphuric acid provokes metal corrosion.

A partial sulphonation of phenol is also observed due to the use of sulphuric acid which results in losses of both sulphuric acid and phenol.

It is an object of the present invention to provide such a process for isolating isobutylene from butane-butylene fraction which would enable the elimination of isobutylene losses due to its polymerization and copolymerization with butenes.

It is another object of the present invention to provide such a process for isolating isobutylene from butane-butylene fraction which would enable the elimination of equipment corrosion.

Still another object of the present invention is to provide such a process for isolating isobutylene from butane-butylene fraction which would enable the elimination of catalyst losses.

These and other objects of the present invention are accomplished by treating butane-butylene fraction with phenol or alkylphenol in the presence of a catalyst such as aluminium, alkylaluminium or aluminium phenoxide in an amount of at least 0.5% by weight of the starting phenol or alkylphenol at a temperature of from 100 to 160° C. under a pressure of 2 to 30 atm. The resulting product of phenol or alkylphenol interaction with isobutylene is subjected to decomposition in the presence of one of the above-mentioned catalysts at a temperature of 180 to 240° C. the formation of isobutylene, as well as of the starting phenol or of a mixture of the starting phenol with mono- and di-tert.butylphenols, or of the starting alkylphenol with its mono- and di-tert.butyl derivatives. Isobutylene is isolated in a gaseous state, and the phenols resulting from the decomposition are recycled to the stage of butane-butylene fraction treatment.

When treating butane-butylene fraction in the presence of said catalysts, the processes of isobutylene polymerization and copolymerization with butenes do not occur; equipment corrosion and catalyst losses are eliminated.

In order to completely eliminate side reactions resulting in resinification, it is advisable to conduct the treatment of butane-butylene fraction at a temperature of 140° C. whereas the decomposition of the phenol or alkylphenol interaction product with isobutylene should be conducted at a temperature of 200 to 230° C.

In order to speed up isobutylene evolution, it is advantageous to conduct the above-mentioned decomposition process until the formation of a monotert.butyl derivative of the starting phenol or alkylphenol in an amount of 70 to 90% by weight of the starting phenol or alkylphenol.

It is preferable to purge the interaction product of phenol or alkylphenol and isobutylene, prior to the decomposition, with nitrogen or isobutylene. This enables producing, after said decomposition of the interaction product, isobutylene exempted from components of the starting butanebutylene fraction.

The process for isolating isobutylene from butane butylene fraction according to the present invention may be effected in the following manner.

Gaseous butane-butylene fraction is bubbled at a temperature of 100 to 160° C. and preferably at 140° C. through a molten phenol or alkylphenol, wherein a catalyst has been previously incorporated such as aluminium, alkylaluminium, e.g., triisobutylaluminium, triethylaluminium, or aluminium phenoxide in an amount of at least 0.5% by weight of the starting phenol or alkylphenol. Therewith, isobutylene selectively reacts with said phenols (phenol alkylation process), while unreacted components of the starting butanebutylene fraction (viz butane, butene-1, and butene-2) are evacuated as waste gases from the reaction zone.

To make the interaction of phenols with isobutylene deeper, it is advantageous to effect said interaction in a counter-current mass-exchange apparatus such as a rectification column.

As the alkylphenols, in the stage of treating the starting butane-butylene fraction, use may be made of, e.g., cresols, ethylphenol, butylphenols, or mixtures thereof.

In order to improve the effectiveness of the catalyst action, butane-butylene fraction is dried, prior to the treatment with phenols, to remove water.

The liquid mixture resulting from treating butane-butylene fraction with phenol or alkylphenol, i.e., obtained from phenol alkylation with isobutylene, contains certain amounts of butene and butenes in a dissolved state. Therefore, it is desirable to deliver said mixture into a desorption apparatus for purging with nitrogen or isobutylene to completely remove said dissolved products and produce pure isobutylene.

Then, the liquid mixture is fed into a dealkylation apparatus, wherein isobutylene is isolated from said mixture through the decomposition thereof at a temperature of 180 to 240° C., preferably at 200 to 230° C. Said decomposition may be conducted till the formation of the starting phenol or alkylphenol. This, however, may result in an essential increase of the dealkylation time and reaction volume. Consequently, the decomposition is conducted so as to obtain, along with the starting phenol or alkylphenol, mono- and ditert.butyl derivatives thereof in the resulting mixture. As has been pointed out hereinabove, it is especially advantageous to perform the decomposition till the formation of a mono-tert.butyl derivative of the starting phenol or alkyl-phenol in an amount of 70 to 90% by weight as calculated for the starting phenol or alkylphenol.

Isobutylene resulting from the decomposition is withdrawn in a gaseous form, while the liquid containing phenol or a mixture thereof with mono- and di-tert.butyl phenols, or the starting phenol or a mixture thereof with its mono- and di-tert.butyl derivatives, is recycled to the stage of treating butane-butylene fraction.

The following examples of isolating isobutylene from butane-butylene fraction are given hereinbelow for a better understanding of the present invention.

EXAMPLE 1

1.5 g. of aluminum are dissolved in 188 g. of phenol at a temperature of 160–170° C. The resulting solution is poured into three bubblers in the absence of any moisture, the liquid layer height in each bubbler being equal to 100 mm. At 140° C. and under 10 atm. pressure a gaseous butane-butylene fraction consisting of 22% by weight of isobutylene, 40% by weight of butane, and 38% by weight of butene–1 and butene–2, in the amount of 230 g. is passed through the bubblers. The unreacted components of the butane-butylene fraction (viz, butane, butene-1 and butene–2) are evacuated in a gaseous form.

The resulting liquid product is transferred into a flask provided with a reflux condenser and purged with nitrogen at a temperature of 110° C. for 30 minutes. Thereafter, the mixture is heated to a temperature of 230° C. for a period of 5 hours. The evolving isobutylene is condensed upon cooling. 50.8 g. of isobutylene are thus obtained with the concentration of the main substance of 99.6% by weight. The degree of isolation isobutylene from the butane-butylene fraction is 99.8%. The remaining liquid product comprising the starting phenol is recycled to the stage of treating butane-butylene fraction in bubblers.

EXAMPLE 2

Into a column-type apparatus provided with ten screen plates phenol is fed from the top; in said phenol aluminium phenoxide is dissolved in the amount of 1% by weight of the phenol. Butane-butylene fraction consisting of 12% by weight of isobutylene, 45% by weight of butane, and 43% by weight of butene–1 and butene–2 is fed into the apparatus from the bottom at a rate of 50 ncm.$^3$ per g. of phenol. The temperature within the apparatus is maintained at 130° C. and pressure is 15 atm.

The resulting liquid mixture containing 5% by weight of phenol, 20% by weight of mono-tert.butylphenol, 35% by weight of di-tert.butylphenol, and 40% by weight of tri-tert.butylphenol is drained from the bottom part of the apparatus and delivered into a desorption apparatus, wherein it is purged with nitrogen. Then the mixture is fed into a dealkylation reactor, wherein it is subjected to the decomposition at a temperature of 200° C. and for a period of contact equal to 2 hours. Such decomposition of the mixture having the above-mentioned constituents results in the production of gaseous isobutylene with the concentration of the main substance of 99.2% by weight, and a liquid mixture containing 2.5% by weight of phenol, 90% by weight of mono-tert.butylphenol and 7.5% by weight of di-tert. butylphenol. This mixture is recycled into the column-type apparatus to the stage of treating butane-butylene fraction.

The degree of isolating isobutylene from the butane-butylene fraction is 92%.

EXAMPLE 3

To 215 g. of cresol 20 ml. of triisobutylaluminium are added under the atmosphere of nitrogen. The resulting mixture is poured into three bubblers, and 260 g. of butane-butylene fraction consisting of 30% by weight of isobutylene, 33.8% by weight of butane, and 36.2% by weight of butene–1 and butene–2 are passed through the bubblers at a temperature of 120° C. and under a pressure of 3 atm. Isobutylene isolation is effected in the same manner as set forth in Example 1, with the exception of purging with nitrogen the interaction product of p-cresol and isobutylene. 76 g. of isobutylene with the concentration of the main substance of 98.9% by weight, are thus obtained.

The liquid product containing 5% by weight of the starting p-cresol, 70% by weight of mono-tert.butyl-p-cresol, and 25% by weight of di-tert.butyl-p-cresol is delivered, after the decomposition of the interaction product, into the bubblers decomposition of the interaction product, into the bubblers back to the stage of treating butane-butylene fraction.

EXAMPLE 4

Into the upper part of a column-type apparatus provided with ten screen plates xylenol is added in which triethylaluminium is dissolved in a amount of 0.5% by weight of the xylenol. Into the lower part of the apparatus butane-butylene fraction is fed containing 10% by weight of isobutylene, 50% by weight of butane, and 40% by weight of butene-1 and butene-2 at a rate of 100 ncm.$^2$ hr. per g. of the xylenol. The temperature within the column is maintained at 160° C., and the pressure employed is 30 atm.

The unreacted gaseous products, viz, butane, butene-1, and butene-2, are evacuated from the column top. The resulting liquid mixture containing 2.5% by weight of xylenol, 25.5% by weight of mono-tert.butylxylenol, and 75% by weight of ditert.butylxylenol is drained from the bottom of the apparatus and purged with isobutylene. Then the mixture is fed into a dealkylation reactor, wherein it is subjected to the decomposition at a temperature of 240° C. and for a period of contact of 1.5 hours. Such decomposition of the above-described mixture results in gaseous isobutylene with the main substance concentration of 99.9% by weight, and a liquid mixture containing 40% by weight of xylenol, 50% by weight of mono-tert.butylxylenol, and 10% by weight of di-tert.butylxylenol. This mixture is fed into the column-type apparatus back to the stage of treating butane-butylene fraction.

The degree of isolation of isobutylene from the butane-butylene fraction is about 100%.

We claim:

1. A process for isolating isobutylene from butane-butylene fraction which comprises treating butane-butylene fraction with a substance selected from the group consisting of phenol and alkylphenol, in the presence of a catalyst selected from the group consisting of aluminium, alkylaluminium, and aluminium phenoxide, in an amount of at least 0.5% by weight of said substance at a temperature of from 100 to 160° C. and under a pressure of from 2 to 30 atm.; decomposing the resulting interaction product of said substance selected from the group consisting of phenol and alkylphenol with isobutylene in the presence of said catalyst at a temperature of from 180 to 240° C. until the formation of isobutylene as well as of phenols selected from the group consisting of the starting phenol, a mixture of the starting phenol with mono- and ditert.butylphenols, the starting alkylphenol and a mixture of the starting alkylphenol with mono- and di-tert. butyl derivatives thereof; isolating isobutylene and recycling the phenols resulting from the decomposition to the stage of treating butane-butylene fraction.

2. A process as claimed in claim 1, wherein butane-butylene fraction is treated at a temperature of 140° C., while the decomposition of the product of interaction of a substance selected from the group consisting of phenol and alkylphenol with isobutylene is effected at a temperature of from 200 to 230° C.

3. A process as claimed in claim 1, wherein the decomposition of the interaction product of phenol and isobutylene is effected until the formation of a mono-tert.butyl derivative of the starting phenol in an amount of 70 to 90% by weight of the starting phenol.

4. A process as claimed in claim 1, wherein the decomposition of the interaction product of alkylphenol and isobutylene is effected until the formation of a mono-tert. butyl derivative of the alkylphenol in an amount of from 70 to 90% by weight of the starting alkylphenol.

5. A process as claimed in claim 1, wherein the interaction product of phenol and isobutylene prior to the decomposition is purged with a gas selected from the group consisting of nitrogen and isobutylene.

6. A process as claimed in claim 1, wherein the interaction product of alkylphenol and isobutylene prior to the decomposition is purged with a gas selected from the group consisting of nitrogen and isobutylene.

References Cited
FOREIGN PATENTS 590,613    7/1947    Great Britain _____ 260—677 A DELBERT E. GANTZ, Primary Examiner J. M. NELSON, Assistant Examiner U.S. Cl. X.R.

260—676 R